(12) United States Patent  (10) Patent No.: US 6,295,938 B1
Stephan  (45) Date of Patent: Oct. 2, 2001

(54) SOIL PREPARATION DEVICE

(76) Inventor: William J. Stephan, R.R. 1 Box 239, Neodesha, KS (US) 66757

( * ) Notice: Subject to any disclaimer, the term of this patent is extended or adjusted under 35 U.S.C. 154(b) by 0 days.

(21) Appl. No.: 09/515,263

(22) Filed: Feb. 29, 2000

(51) Int. Cl.$^7$ ................................................ A01C 5/00
(52) U.S. Cl. ............................................................ 111/52
(58) Field of Search .......................... 111/52, 152, 134, 111/135, 149, 193, 191, 190, 192, 194, 926, 163, 166; 172/538, 80, 68, 413, 178, 180

(56) References Cited

U.S. PATENT DOCUMENTS

| | | |
|---|---|---|
| 1,685,278 | 9/1928 | Dwyer . |
| 1,881,358 | 10/1932 | Hymans . |
| 2,222,015 * | 11/1940 | Bateman ................. 111/80 |
| 2,673,434 | 3/1954 | Babinchak . |
| 2,691,353 * | 10/1954 | Secondo ................. 111/52 |
| 2,734,439 * | 2/1956 | Padrick ................. 111/52 |
| 2,766,672 | 10/1956 | Zunk . |
| 3,131,775 | 5/1964 | Long . |
| 3,190,366 | 6/1965 | Johnson et al. ......... 172/413 |
| 4,212,254 | 7/1980 | Zumbahlen .............. 111/52 |
| 4,245,706 | 1/1981 | Dietrich, Sr. ............ 172/80 |
| 4,361,191 | 11/1982 | Landoll et al. .......... 172/146 |
| 4,542,793 | 9/1985 | Dietrich, Sr. ........... 172/180 |
| 4,703,810 | 11/1987 | Meiners ................ 172/178 |
| 5,095,832 * | 3/1992 | Rumbaugh ............. 111/193 |

* cited by examiner

Primary Examiner—Robert E. Pezzuto
(74) Attorney, Agent, or Firm—William R. Sharp

(57) ABSTRACT

The invention is a soil preparation device for use with a planter row unit of the type which includes a front face, a furrow opener to the rear of the front face, a seed dispenser, and a furrow closer to the rear of the furrow opener and seed dispenser. The device comprises: a bracket having a longitudinal axis; a pair of front discs rotatably mounted to the bracket on opposite sides thereof, each front disc being angularly oriented with respect to the bracket axis so as to have a leading edge closely adjacent to the bracket axis and a trailing edge transversely spaced from such axis; a pair of rear discs rotatably mounted to the bracket on opposite sides thereof, each rear disc being angularly oriented with respect to the bracket axis so as to have a leading edge transversely spaced farther from the bracket axis than the trailing edge of each front disc, and a trailing edge transversely spaced from but closer to the bracket axis than the leading edge of such rear disc; and a mounting member, extending from and integrally connected to the bracket, for use in removably mounting the bracket to the front face of said planter row unit so as to position the rear discs adjacent to the front face and at least portions of the front discs in front of the rear discs.

11 Claims, 3 Drawing Sheets

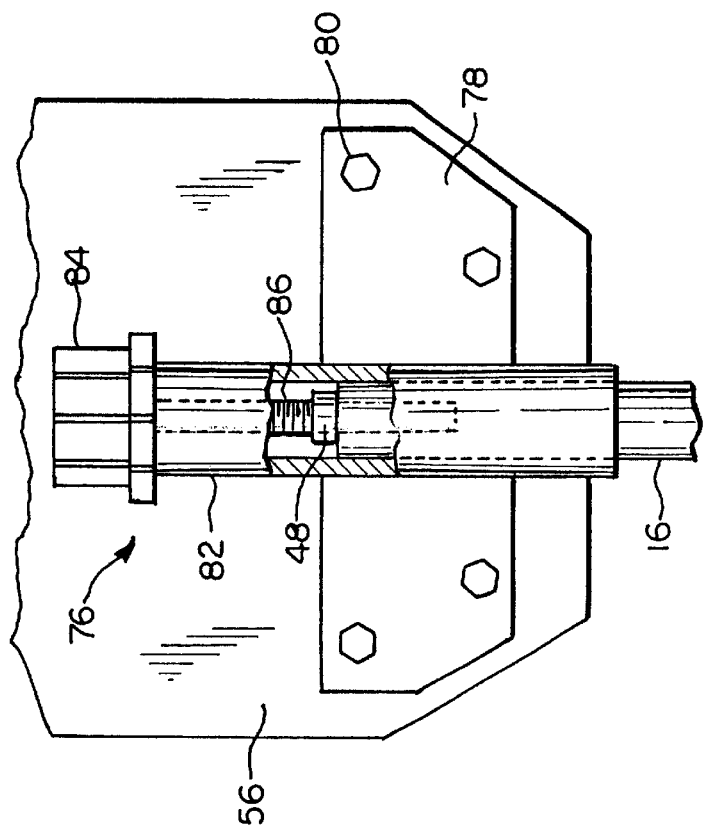
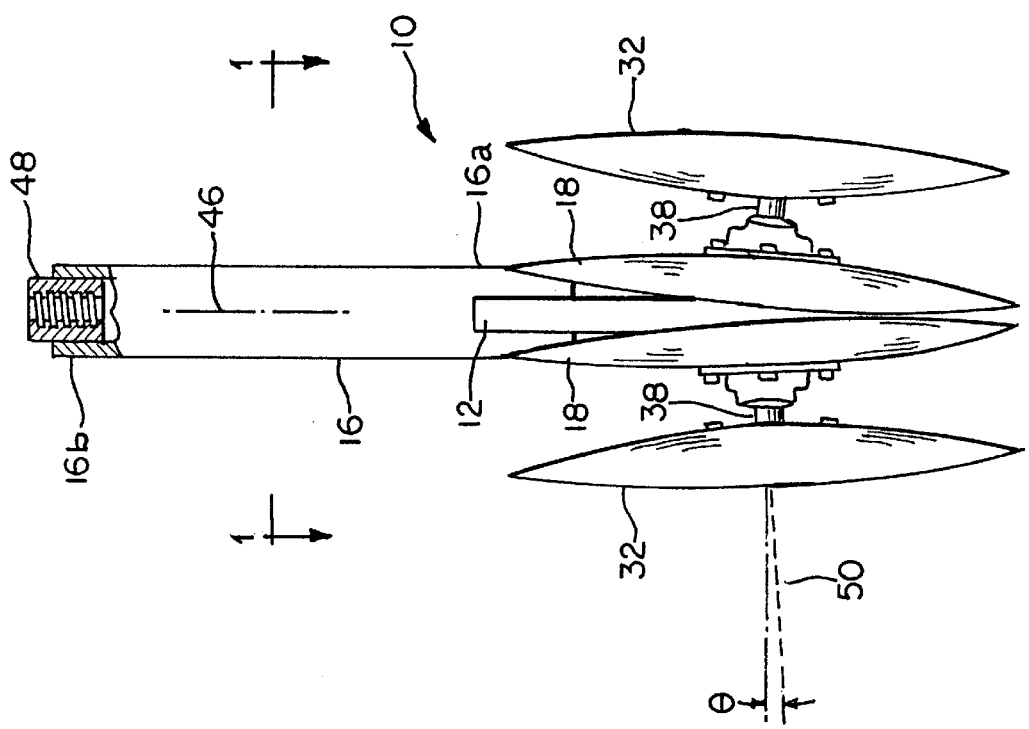

SOIL PREPARATION DEVICE

BACKGROUND OF THE INVENTION

The invention relates to a soil preparation device for use with a planter row unit in no-till farming.

A planter as used in no-till farming comprises a number of row units to simultaneously plant multiple rows of crops. This type of planter row unit typically has a front face, a furrow opener (i.e. discs) to the rear of the front face for opening a furrow in the soil, a seed dispenser (i.e. seed hopper and seed tube) for dropping seed into the furrow, and a furrow closer (i.e. closing wheels) to the rear of the furrow opener and seed dispenser for closing the furrow to thereby cover the seed with soil.

A coulter blade is commonly mounted to the front face of the planter row unit for breaking up a top layer of soil in preparation for planting. However, the coulter blade aggressively breaks up a narrow (i.e. about 1 inch wide) band of soil so as to form a groove therein, and tends to throw at least some of the desirably dry and frangible soil from the above-mentioned top layer outside the path of the planter row unit. consequently, such desirable soil is lost for use in planting, making it more difficult for the row unit to close the furrow with soil which tends to be moist and more compacted. It is important to properly cover the seed with soil to ensure germination and to protect the seed from birds and insects.

SUMMARY OF THE INVENTION

It is, therefore, an object of the invention to provide a soil preparation device for use with a planter row unit which can effectively break up a top layer of soil over a wider area than a coulter blade while minimizing the loss of such desirable soil for use in planting.

The above object is realized by a soil preparation device for use with a planter row unit of the type which includes a front face, a furrow opener to the rear of the front face, a seed dispenser, and a furrow closer to the rear of the furrow opener and seed dispenser, wherein the soil preparation device comprises: a bracket having a longitudinal axis; a pair of front discs rotatably mounted to the bracket on opposite sides thereof, each front disc being angularly oriented with respect to the bracket axis so as to have a leading edge closely adjacent to the bracket axis and a trailing edge transversely spaced from such axis; a pair of rear discs rotatably mounted to the bracket on opposite sides thereof, each rear disc being angularly oriented with respect to the bracket axis so as to have a leading edge transversely spaced farther from the bracket axis than the trailing edge of each front disc, and a trailing edge transversely spaced from but closer to the bracket axis than the leading edge of such rear disc; and a mounting member, extending from and integrally connected to the bracket, for use in removably mounting the bracket to the front face of said planter row unit so as to position the rear discs adjacent to the front face and at least portions of the front discs in front of the rear discs. In a preferred embodiment hereafter described, the mounting member comprises a tube, hereafter referred to as a mounting tube.

BRIEF DESCRIPTION OF THE DRAWINGS

FIG. 2 is a front view of the device of FIG. 1 showing an end portion of the mounting tube in longitudinal cross section.

FIG. 4 illustrates, as viewed along line 4—4 in FIG. 3, the manner in which the mounting tube of the device is mounted to the front face by means of a mount assembly, a portion of which is broken away to show details therein.

DETAILED DESCRIPTION OF THE INVENTION

Figure 1:
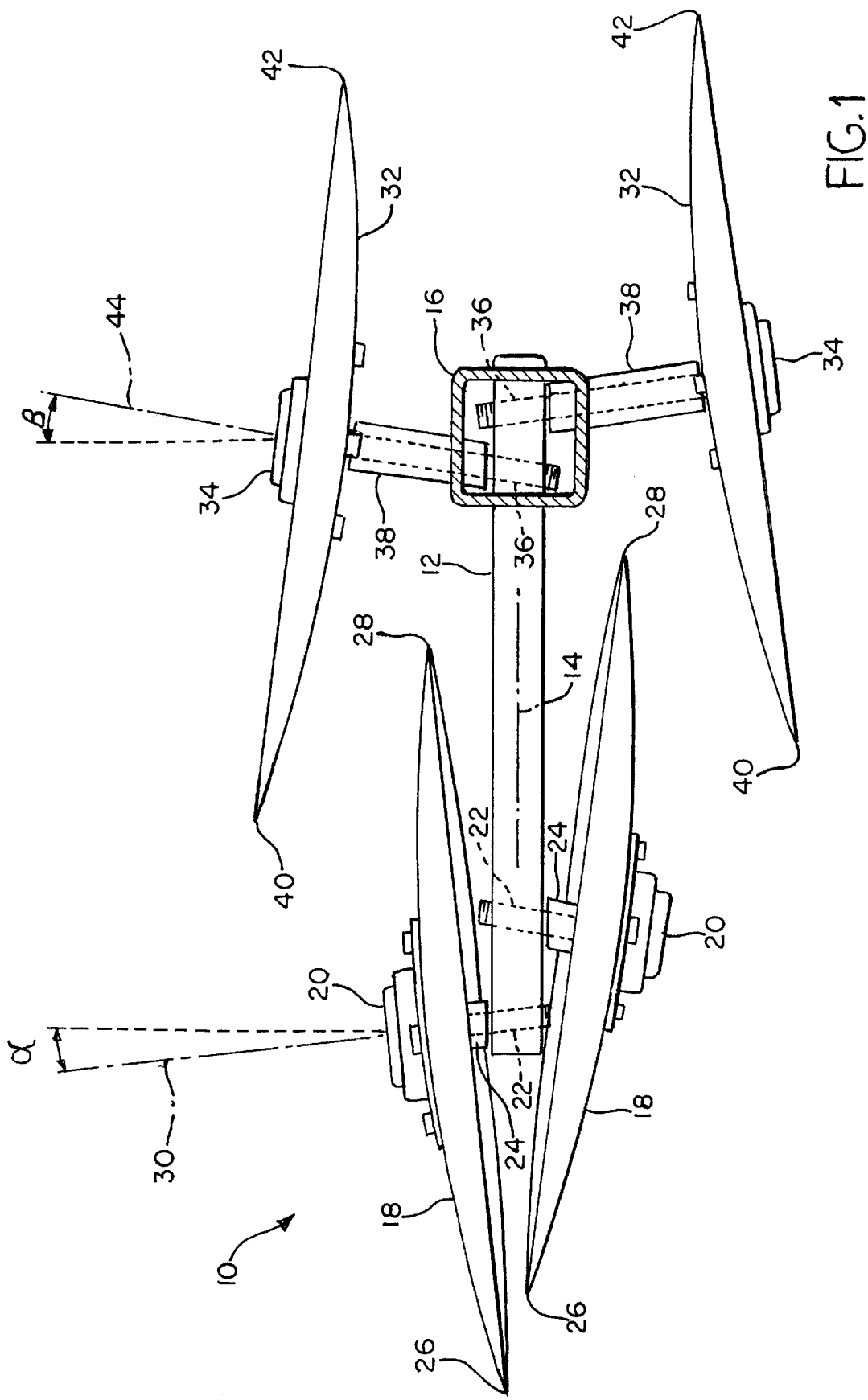
FIG. 1 is an illustration of one embodiment of the soil preparation device showing a top view of its bracket and discs, and also showing a middle portion of its mounting tube in transverse cross section.

Referring to FIG. 1, soil preparation device 10 includes a bracket 12 having a longitudinal axis 14. Bracket 12 preferably has a thickness of at least about ½ inch. A mounting tube 16, preferably substantially square in shape as shown in cross section, extends from and is integrally connected to bracket 12 (as is more clearly shown in subsequently described FIG. 2). The term "integrally connected", as used herein with regard to two integrally connected members, means that the members are fixedly connected to one another or actually integral with one another.

A pair of front discs 18 are rotatably mounted to bracket 12 on opposite sides thereof by means of respective bearing hubs 20 and bolts 22 threadedly received (as indicated by broken lines) in corresponding openings drilled through bracket 12 at the appropriate angle, as discussed further below. Spacer bushings 24 are received over portions of bolts 22 and function to space front discs 18 from bracket 12. Each front disc 18 is angularly oriented with respect to axis 14 so as to have a leading edge 26 closely adjacent to axis 14 and a trailing edge 28 transversely spaced from such axis. Most preferably, leading edges 26 are longitudinally aligned along axis 14 to ensure that there is no undisturbed strip of soil between the front discs. More specifically with respect to angular orientation, each front disc 18 has a rotational axis 30 inclined frontwardy at an angle $\alpha$ of preferably about 9–12°.

A pair of rear discs 32 are rotatably mounted to bracket 12 on opposite sides thereof by means of respective hubs 34 and bolts 36 threadedly received (as indicated by broken lines) in corresponding openings drilled through bracket 12 at the appropriate angle, as discussed further below. Spacer bushings 38 are received over portions of bolts 36 and function to space rear discs 32 from bracket 12. Each rear disc 32 is angularly oriented with respect to axis 14 so as to have a leading edge 40 transversely spaced farther from axis 14 than the trailing edge of each front disc, and a trailing edge 42 transversely spaced from but closer to axis 14 than leading edge 40. Leading edge 40 of each rear disc is preferably spaced about 2–4 times farther from axis 14 than trailing edge 28 of each front disc. Trailing edge 42 of each rear disc is preferably spaced about 1–3 times farther from axis 14 than trailing edge 28 of each front disc. More specifically with respect to angular orientation, each rear disc 32 has a rotational axis 44 inclined rearwardly at an angle $\beta$ of preferably about 12–14°.

Each of front discs 18 and rear discs 32 is preferably cupped in shape, as shown, so as to have a concave side and a convex side. Each front disc 18 preferably has its concave side facing toward bracket 12 and its axis 14, and each rear disc 32 preferably has its convex side facing toward the bracket and its axis. Therefore, with the discs angularly oriented as discussed above, the convex sides of the discs can gently move the soil without throwing it, the importance of which should be apparent from previous discussion.

As shown in the illustrated embodiment, front discs 18 are longitudinally offset from one another, and rear discs 32 are also longitudinally offset from one another. Front discs 18 as offset from one another allows their leading edges 26 to be longitudinally aligned along axis 14, and provides for more effective cutting into the soil with one leading edge at a time. Rear discs 32 as offset from one another helps prevent plugging between such discs with trash and debris encountered in the field.

Front discs 18 and rear discs 32 also preferably overlap insofar as trailing edge 28 of each front disc is positioned to the rear of leading edge 40 of each rear disc. This feature has the advantages of making the device more compact and in helping to prevent the possible movement of soil outside the leading edges of rear discs 32.

Referring to FIG. 2, mounting tube 16 has a longitudinal axis 46 which is perpendicular to longitudinal axis 14 (FIG. 1) of bracket 12. Mounting tube 16 also has a lower end portion 16a integrally connected to bracket 12 and an upper end portion 16b shown in cross section. An internally threaded insert 48 is received in and integrally connected to upper end portion 16b. Each of the discs has a rotational axis, as for example the one indicated at 50, which is inclined downwardly at an angle Θ of preferably about 2–4°. Each disc preferably has a diameter of about 8–12 inches, most preferably about 8 inches.

Soil preparation device 10 is generally of a metallic construction, such as steel, for optimum strength and durability.

Figure 3:
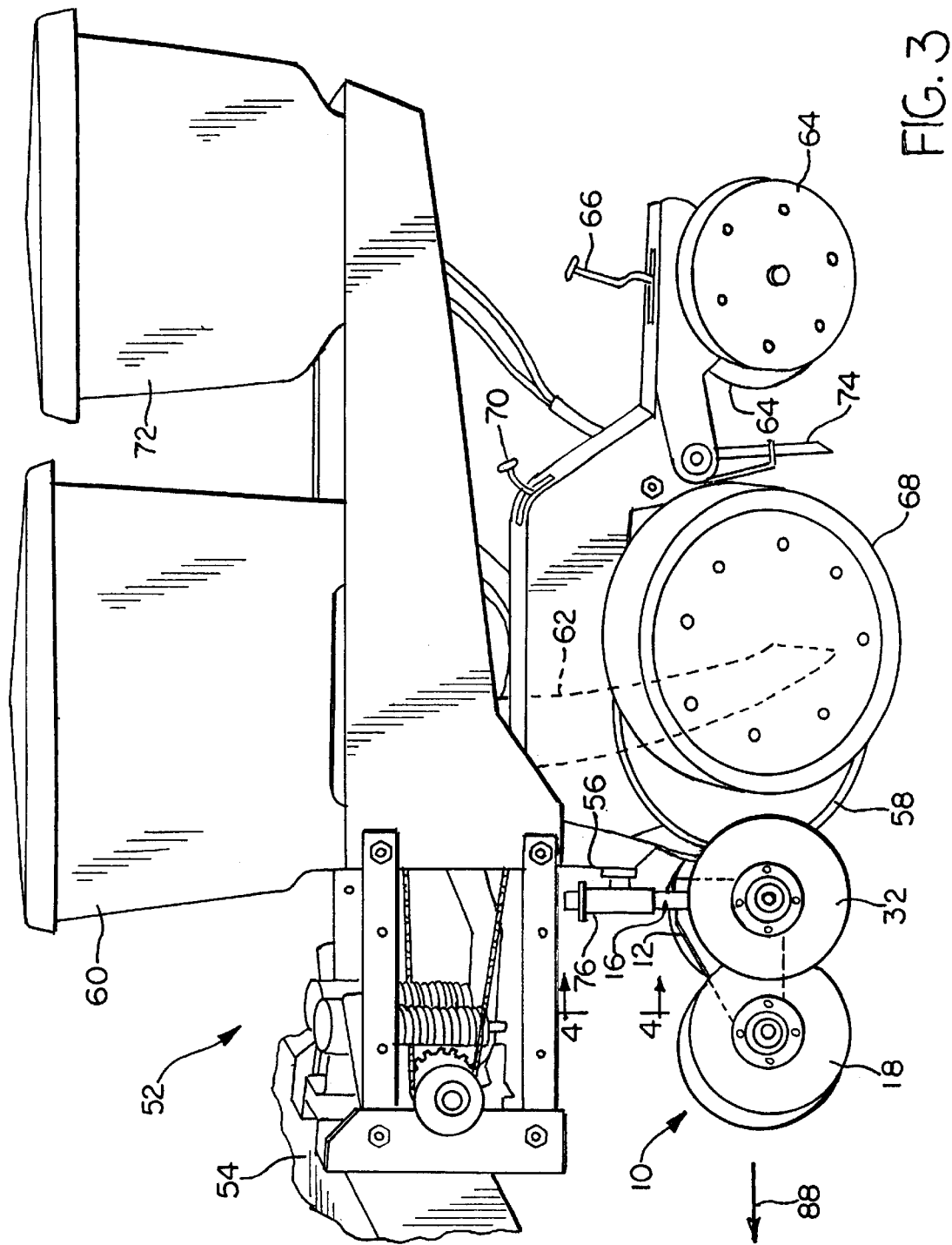
FIG. 3 illustrates the soil preparation device as mounted to the front face of a planter row unit.

Referring to FIG. 3, the illustrated planter row unit 52, as mounted to a frame 54 (of which only a small portion is shown), includes: front face 56; opener discs 58 (of which only one is visible), to the rear of front face 56, for opening a furrow in the soil; seed hopper 60; seed tube 62 (indicated by broken lines) for receiving seed from seed hopper 60 and dropping such seed into the furrow; and closing wheels 64, to the rear of discs 58 and seed tube 62 and adjustable in down-force by T-handle 66, for closing the furrow to thereby cover the seed with soil. Planter row unit 52 also includes gauge wheels 68 (only one of which is visible) adjustable by means of T-handle 70 for setting the depth of the furrow, and a chemical hopper 72 from which chemicals can be dispensed through chemical tube 74 between discs 58 and closing wheels 64.

Bracket 12 (part of which is indicated by broken lines) of soil preparation device 10 is removably mounted to front face 56 by means of mounting tube 16 as received by a mount assembly 76. As thus mounted, rear discs 32 are adjacent to front face 56 and those portions of front discs 18 not overlapped by rear discs 32 are directly in front of such rear discs.

Referring to FIG. 4, mount assembly 76 is shown as comprising a mounting plate 78 as mounted to front face 56 by bolts 80, a square receptacle tube 82 integrally connected to mounting plate 78, a cap 84, and a threaded shaft 86 (portions of which are indicated by broken lines) depending from and integrally connected to cap 84. Commercially available DAWN® mount assemblies are particularly preferred. That portion of receptacle tube 82 as broken away reveals the manner in which mounting tube 16 is received therein with its internally threaded insert 48 threadedly received over threaded shaft 86. The longitudinal position of mounting tube 16 in receptacle tube 82 is adjustable by rotation of cap 84, which can then be locked in position by a mechanism not shown. Accordingly, the depth at which the front and rear discs cut into the top layer of soil is adjustable. A typical depth is about 1–1½ inch.

Operation of soil preparation device 10 is most easily described by assuming certain dimensions, which should not be construed to limit the invention in any manner. For example, it can be assumed with reference to front discs 18 and rear discs 32 in FIG. 1 that leading edges 26 of the front discs are aligned along axis 14, that trailing edge 28 of each front disc is transversely spaced from axis 14 about 1 inch, that leading edge 40 of each rear disc is transversely spaced from axis 14 about 3 inches, and that trailing edge 42 of each rear disc is transversely spaced from axis 14 about 2 inches. By moving in the forward direction indicated at 88 in FIG. 3, front discs 18 break up and move a middle 2 inches of soil outwardly. Rear discs 32 break up and move an outermost inch of soil inwardly as well as the soil moved outwardly by the front discs. A 4 inch wide band of loosened and mixed soil is thereby created for planting by the planter row unit, with little or no soil as broken up by the discs being lost outside of this band.

Obviously, many modifications and variations of the present invention are possible in light of the above teachings. It is, therefore, to be understood that within the scope of the appended claims, the invention can be practiced otherwise than as specifically described.

That which is claimed is:

1. A soil preparation device for use with a planter row unit of the type which includes a front face, a furrow opener to the rear of the front face, a seed dispensing tube adjacent to the furrow opener, and a furrow closer to the rear of the furrow opener and seed dispensing tube, wherein the soil preparation device comprises:

a bracket having a longitudinal axis;

a pair of front discs rotatably mounted to the bracket on opposite sides thereof, each front disc being angularly oriented with respect to the bracket axis so as to have a leading edge closely adjacent to the bracket axis and a trailing edge transversely spaced from the bracket axis, and wherein the front discs are longitudinally offset from one another so that their respective leading edges are approximately aligned along the bracket axis;

a pair of rear discs rotatably mounted to the bracket on opposite sides thereof, each rear disc being angularly oriented with respect to the bracket axis so as to have a leading edge transversely spaced farther from the bracket axis than the trailing edge of each front disc, and a trailing edge transversely spaced from but closer to the bracket axis than the leading edge of such rear disc; and a mounting tube, extending from and integrally connected to the bracket, for use in removably mounting the bracket to the front face of said planter row unit so as to position the rear discs adjacent to the front face and at least portions of the front discs in front of the rear discs.

2. A soil preparation device as recited in claim 1 wherein each of the front and rear discs is cupped in shape so as to have a concave side and a convex side, and wherein each front disc has its concave side facing toward the bracket and its axis and each rear disc has its convex side facing toward the bracket and its axis.

3. A soil preparation device as recited in claim 2 wherein the rear discs are longitudinally offset from one another.

4. A soil preparation device as recited in claim 1 wherein the front and rear discs overlap insofar as the trailing edge of each front disc is positioned to the rear of the leading edge of each rear disc.

5. A soil preparation device as recited in claim 1 wherein the leading edge of each rear disc is transversely spaced about 2–4 times farther from the bracket axis than the trailing edge of each front disc.

6. A soil preparation device as recited in claim 5 wherein the trailing edge of each rear disc is transversely spaced about 1–3 times farther from the bracket axis than the trailing edge of each front disc.

7. A soil preparation device as recited in claim 1 wherein the mounting tube has a longitudinal axis substantially perpendicular to the bracket axis.

8. A soil preparation device as recited in claim 7 wherein the mounting tube is substantially square in shape.

9. An apparatus comprising:
   a planter row unit which includes a front face, a furrow opener to the rear of the front face, a seed dispensing tube adjacent to the furrow opener, and a furrow closer to the rear of the furrow opener and seed dispensing tube; and
   a soil preparation device which includes (i) a bracket having a longitudinal axis, (ii) a pair of front discs rotatably mounted to the bracket on opposite sides thereof, each front disc being angularly oriented with respect to the bracket axis so as to have a leading edge closely adjacent to the bracket axis and a trailing edge transversely spaced from the bracket axis, (iii) a pair of rear discs rotatably mounted to the bracket on opposite sides thereof, each rear disc being angularly oriented with respect to the bracket axis so as to have a leading edge transversely spaced farther from the bracket axis than the trailing edge of each front disc, and a trailing edge transversely spaced from but closer to the bracket axis than the leading edge of such rear disc, and (iv) a mounting member extending from and integrally connected to the bracket, the mounting member being removably mounted to the front face of said planter row unit so as to position the rear discs adjacent to the front face and at least portions of the front discs in front of the rear discs.

10. An apparatus as recited in claim 9 wherein the mounting member comprises a tube, hereafter referred to as the mounting tube, and wherein the apparatus further comprises a mount assembly fixedly mounted to the front face and having a receptacle tube in which the mounting tube is removably received.

11. An apparatus as recited in claim 10 wherein the position of the mounting tube in the receptacle tube is adjustable.

* * * * *